(12) United States Patent
Ishii et al.

(10) Patent No.: US 7,748,504 B2
(45) Date of Patent: Jul. 6, 2010

(54) HYDRAULIC SERVO FOR A BRAKE IN AN AUTOMATIC TRANSMISSION

(75) Inventors: Katsuhisa Ishii, Okazaki (JP); Minoru Todo, Takahama (JP); Masato Nakano, Hekinan (JP); Takuya Nakajima, Toyota (JP); Hirofumi Ota, Toyota (JP); Atsushi Honda, Seto (JP); Kazutoshi Nozaki, Aichiken (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 857 days.

(21) Appl. No.: 11/599,988

(22) Filed: Nov. 16, 2006

(65) Prior Publication Data
US 2007/0151826 A1 Jul. 5, 2007

(30) Foreign Application Priority Data

| Nov. 17, 2005 | (JP) | ............................. 2005-333338 |
| Nov. 17, 2005 | (JP) | ............................. 2005-333383 |
| Nov. 17, 2005 | (JP) | ............................. 2005-333385 |
| Nov. 17, 2005 | (JP) | ............................. 2005-333442 |
| Nov. 29, 2005 | (JP) | ............................. 2005-344758 |

(51) Int. Cl.
*F16D 55/36* (2006.01)

(52) U.S. Cl. ................ 188/71.5; 192/85.24; 192/85.27; 192/85.39

(58) Field of Classification Search ................ 188/71.5, 188/72.4, 72.3, 140 A, 151 R; 192/85 AA, 192/70.12, 70.17, 70.2, 70.21, 70.27, 70.28, 192/85.24, 85.27, 85.39
See application file for complete search history.

(56) References Cited

U.S. PATENT DOCUMENTS 3,841,452 A * 10/1974 Newsock et al. ......... 192/107 R
4,724,745 A * 2/1988 Sumiya et al. ................ 92/107

(Continued)

FOREIGN PATENT DOCUMENTS

JP 59-180131 10/1984

(Continued)

*Primary Examiner*—Robert A Siconolfi
*Assistant Examiner*—Mariano Sy
(74) *Attorney, Agent, or Firm*—Bacon & Thomas, PLLC (57) ABSTRACT

A hydraulic servo for a brake in an automatic transmission has a piston secured against rotation without provision of a protrusion on the piston engaging the transmission casing. The piston of the hydraulic servo has an inner cylindrical surface configured to grasp, along their lengths, return springs compressed between the piston and a return plate to which the return springs are fixed. The return plate is bolted to a bulkhead portion of the transmission case and, thus, the piston member is fixed to the bulkhead portion and thereby prevented from rotating.

2 Claims, 7 Drawing Sheets

U.S. PATENT DOCUMENTS

| | | | | |
|---|---|---|---|---|
| 5,172,799 A | * | 12/1992 | Iijima et al. | 192/106 F |
| 5,377,954 A | * | 1/1995 | Adams et al. | 251/306 |
| 5,749,451 A | * | 5/1998 | Grochowski | 192/70.252 |
| 5,842,549 A | * | 12/1998 | Hall, III | 192/70.252 |
| 5,884,730 A | * | 3/1999 | Blackman | 188/71.5 |
| 6,000,514 A | * | 12/1999 | Okada | 192/70.21 |
| 6,024,197 A | * | 2/2000 | Suwa et al. | 192/48.92 |
| 6,206,163 B1 | * | 3/2001 | Schneider | 192/113.35 |
| 6,397,996 B1 | * | 6/2002 | Yabe | 192/55.61 |
| 7,111,911 B2 | * | 9/2006 | Baumgartner et al. | 301/105.1 |
| 7,287,633 B2 | * | 10/2007 | Ichikawa | 192/85 AA |

FOREIGN PATENT DOCUMENTS

| | | | |
|---|---|---|---|
| JP | 63-51938 | | 3/1988 |
| JP | 02-113151 | | 4/1990 |
| JP | 05-248512 | | 9/1993 |
| JP | 2002-070753 | | 3/2002 |
| JP | 2003042184 A | * | 2/2003 |
| JP | 2004-060826 | | 2/2004 |

\* cited by examiner

HYDRAULIC SERVO FOR A BRAKE IN AN AUTOMATIC TRANSMISSION

INCORPORATION BY REFERENCE

The disclosure of Japanese Patent Application No. 2005-344758 filed on Nov. 29, 2005, including the specification, drawings and abstract thereof, is incorporated herein by reference in its entirety.

BACKGROUND OF THE INVENTION

1. Field of the Invention

The present invention relates to a hydraulic servo which operates a brake in forming a power transmission path in an automatic transmission of a vehicle, and to an automatic transmission incorporating such a hydraulic servo. More specifically, the present invention is directed to a hydraulic servo for a brake in an automatic transmission with provision for preventing rotation of its piston.

2. Description of the Related Art

Generally, a hydraulic servo for operating a brake in a vehicle automatic transmission comprises a piston member slidably mounted in a cylinder unit, a return plate fixed to the cylinder unit, and coil-shaped return springs compressed between the piston member and the return plate. Typically, the cylinder unit is formed within a transmission case, and an operating oil chamber is formed between the cylinder unit and the piston member which is sealed within the cylinder by various sealing members.

In such a hydraulic servo, responsive to supply of operating oil from a hydraulic control device to the operating oil chamber, the piston member is driven against the biasing force of the return springs toward the return plate, and an edge portion of the piston member comes into contact with and presses together the multiple friction plates forming a brake and disposed on an inner peripheral surface of the transmission case, for engagement of the brake. Responsive to discharge of the operating oil from the operating oil chamber, the piston member is axially moved back toward the bottom of the cylinder unit by the biasing force of the return springs, and the brake is thereby released.

In the conventional brake hydraulic servo mentioned above, because lubricating oil pools in the lower portion of the piston member when the brake is engaged, a drain hole is provided for draining the lubricating oil from that lower portion of the piston member.

Further, in the above described conventional transmission, in engaging a brake, the piston member presses against an axially outermost one of the friction plates which are spline-engaged with the transmission case. At this time, the outermost friction plate rotates only by the amount of play between the engaging splines, in the direction of rotation of inner friction plates which have been rotating prior to engagement, and simultaneously, the piston member pressing the outermost friction plate also rotates. One braking action causes only a slight rotation of the piston, but the piston member does not rotate in reverse when the brake is released, and therefore as the engagement and release of the brake is repeated numerous times, the piston member itself is gradually rotated. Accordingly, the position of the drain hole provided in what was initially the lower portion of the piston member rotates away from that lower position, resulting in lubricating oil pooling in the lower portion of the piston member when the brake is engaged.

To prevent the piston member from rotating, when the braking hydraulic servo is operated and the piston member engages the friction plates, a claw or a foot has been provided on the piston member, which claw or foot is received in a groove in the cylinder unit (Japanese Unexamined Patent Application Publication No. 2002-70753).

However, a protrusion such as a claw or a foot on a piston member may present problems in casting. For example, poor casting may result if the molten metal has not properly flowed (distributed) within the mold. On the other hand, if the protrusion is formed as a separate member and then joined to the piston, for example, affixing the claw or the like by welding or by using bolts becomes necessary, and this increases the number of parts and complicates the manufacturing process.

SUMMARY OF THE INVENTION

Accordingly, it is an object of the present invention to solve the above problems by preventing the rotation of the piston member in a simple manner.

According to a first aspect, the present invention provides a hydraulic servo which engages a brake by axial (x1-x2) movement of a piston, responsive to oil pressure supplied to an operating oil chamber. The hydraulic servo includes a cylinder unit formed in the transmission casing; a piston member slidably mounted in the cylinder unit and forming an operating oil compartment therebetween; a return plate fixed to the casing; and multiple return springs disposed compressed between the piston member and the return plate for biasing the piston member away from contact with the friction elements of the brake.

The return plate has multiple fixing protrusions for positioning and fixing axial ends of the multiple return springs, and the piston member has a radially inner cylindrical surface configured to fit around and hold the multiple return springs for transferring torque received by the piston in braking to those return springs which, in turn, are fixed against rotation. Therefore, the piston member is held against rotation without a protrusion fitted to the casing, i.e. there is no need for a protrusion on the piston. Thus, casting of the piston can be simplified, the number of parts can be reduced, and the manufacturing process can be simplified.

The radially inner portion of the piston member may have multiple round grooves which fit around the peripheries of the multiple return springs.

In the above-described configuration, wherein the piston member has multiple round grooves which cover at least a (e.g. major) portion of the periphery of each of the multiple return springs, the piston member is securely fixed against rotation by the multiple return springs.

The return plate may have multiple connecting portions for connection to the casing and multiple axially extending fixing protrusions disposed unevenly spaced around its circumference (ω1-ω2 direction), with the multiple round grooves around the inner circumference of the piston also having uneven circumferential spacing corresponding to the locations of the multiple return springs.

Accordingly, assembly with insertion of the return springs within the round receiving grooves of the piston cannot be accomplished unless the piston and return springs have the proper relative angular orientation, and thus erroneous assembly is prevented.

The piston member further has a cylindrical skirt portion which is axially aligned to press against the friction plates of the brake, and which has a drain hole for discharge of oil.

The drain hole allows discharge of oil which collects within the skirt, especially when the piston member engages the brake, which lubricating oil is supplied to the space enclosed by the piston member and the friction plates.

According to another aspect, the present invention provides an automatic transmission comprising: a casing; a transmission (speed change mechanism) enclosed within the casing; and a brake formed of multiple friction plates and operated by the hydraulic servo described above.

Thus, the automatic transmission is provided with a braking hydraulic servo which has a piston member held against rotation without need for a protrusion engaged with the case.

The casing may include a transmission case housing the transmission mechanism and a bulkhead member isolating the transmission mechanism within the transmission case; a washer member disposed on the interior face of the bulkhead member, between the bulkhead member and the transmission mechanism; and a return plate which has leg portions fixed to the interior side face of the bulkhead member, and claw portions extending from at least two of the leg portions for securing the washer member to the interior side face of the bulkhead member.

Therefore the return plate fixes the return springs relative to the casing and fixes the washer member to the bulkhead with the claw portions. Thus, erroneous positioning of the washer member when assembling the automatic transmission can be prevented.

DESCRIPTION OF THE PREFERRED EMBODIMENTS

An embodiment of the present invention will be described below with reference to FIGS. 1 through 7.

Figure 1:
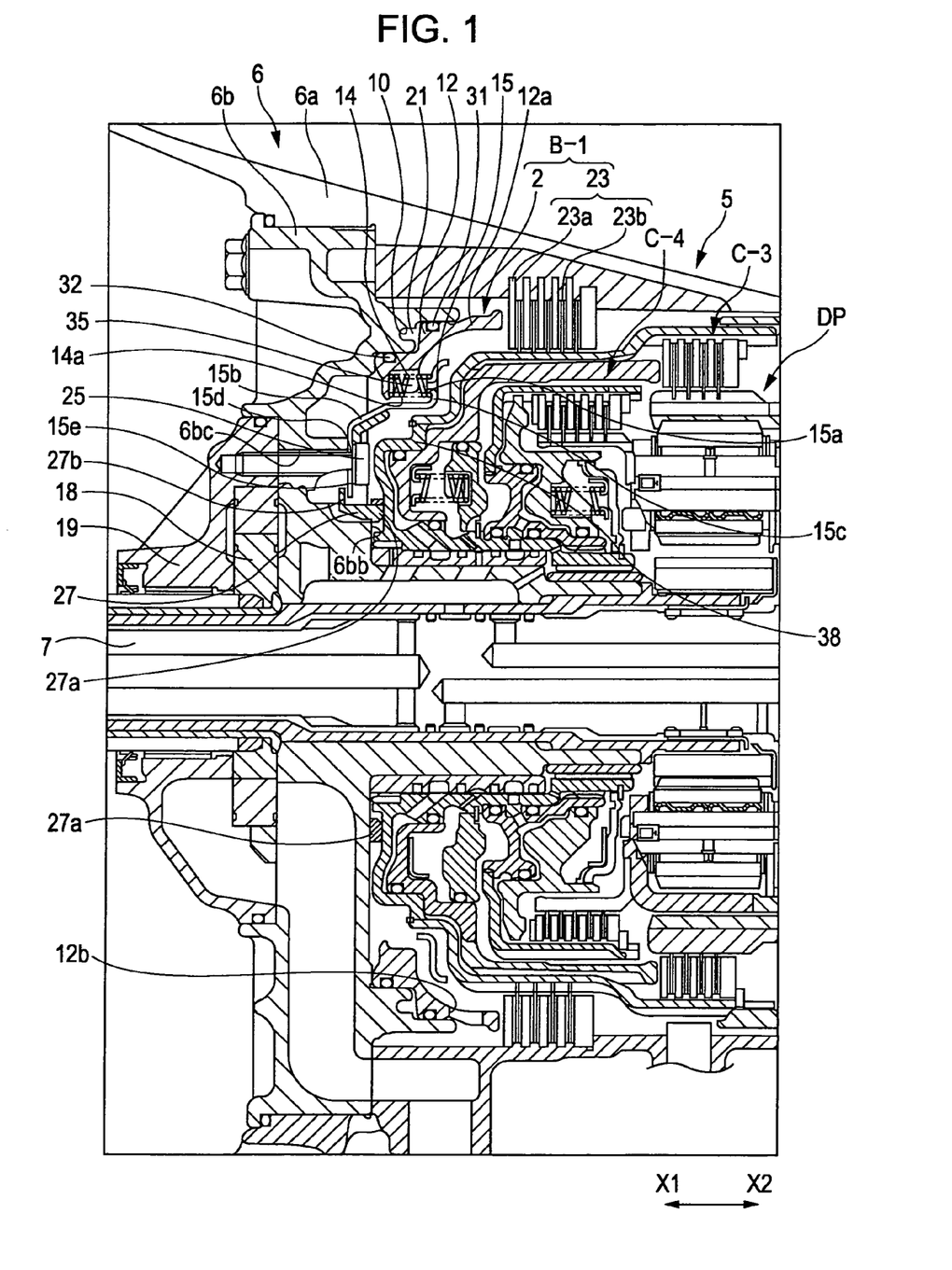
FIG. 1 is a partial longitudinal cross-sectional view of an automatic transmission showing a multi-plate brake and its operating hydraulic servo according to the present invention.

A multi-plate brake 2, operated by a hydraulic servo 2 according to the present embodiment, is incorporated into an automatic transmission 1 which is mounted on a vehicle with FR (front engine/rear-wheel drive), for example, as shown in FIG. 1. The automatic transmission 1 includes a torque converter (not shown), a speed change mechanism 5, a brake B-1, a hydraulic control device (not shown) and so forth, a casing 6 formed of a transmission case 6a and a bulkhead member 6b. The speed change mechanism 5 includes an input shaft 7, multiple clutches, and a gear mechanism formed of at least one planetary gear set or the like. Also, the brake mechanism B-1 includes a braking hydraulic servo 2 in accordance with the present invention and multiple friction plates 23.

As shown in detail in FIG. 1, the braking hydraulic servo (hereafter referred to simply as "hydraulic servo") 2 includes a cylinder 10 formed in the bulkhead member 6b, a piston member 12 slidably mounted in cylinder 10, return springs 14, and a return plate (supporting plate) 15.

Figure 2:
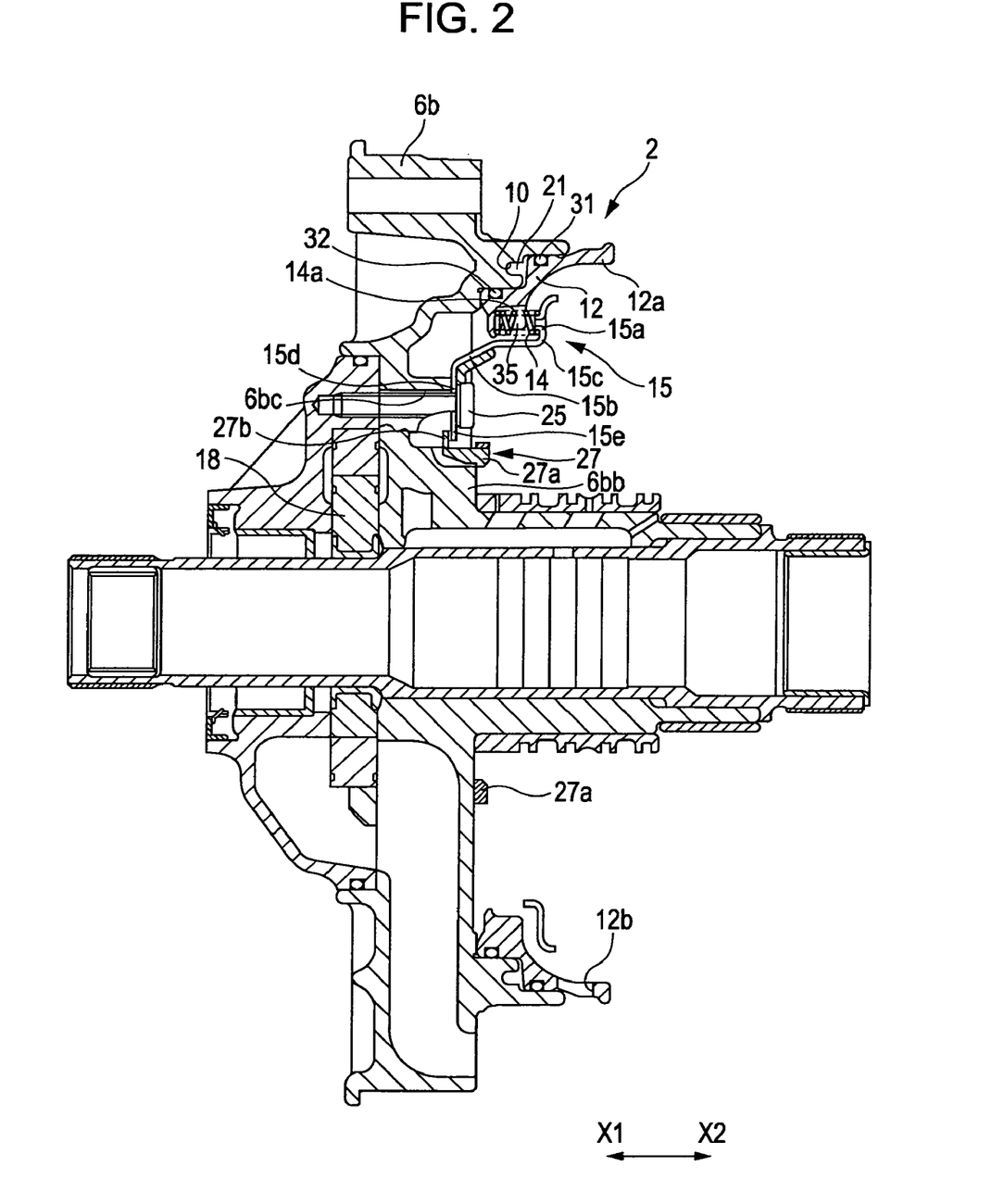
FIG. 2 is an enlarged of a portion of FIG. 1 showing the hydraulic servo affixed to a bulkhead member.
Figure 3:
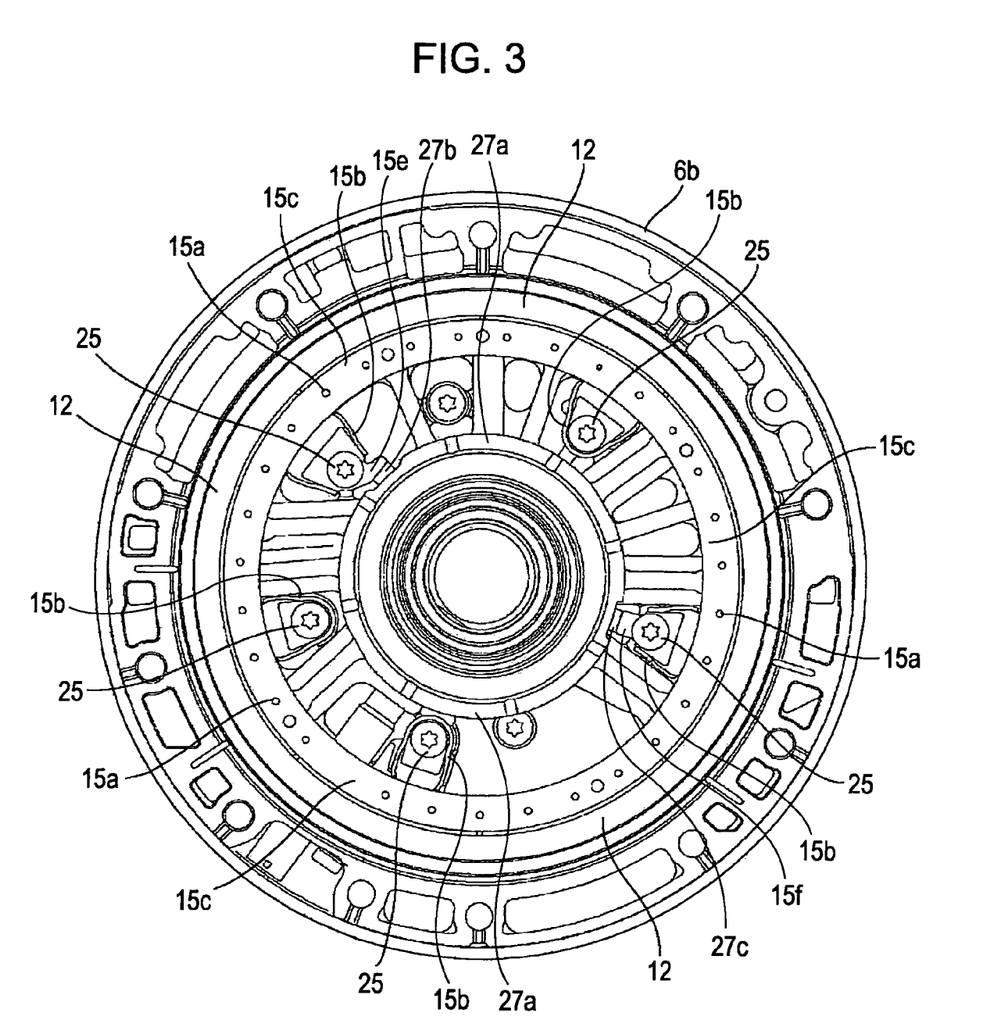
FIG. 3 is an axial cross-sectional view from the X-1 direction taken through the structure shown in FIG. 2.

As shown in detail in FIGS. 2 and 3, the bulkhead member 6b has a generally round plate shape and is oriented perpendicular to the axis of the input shaft 7 (X1-X2 direction). The bulkhead member 6b is inserted and fixed within the torque converter end of the transmission case 6a, and separates the torque converter from the transmission mechanism 5 and the brake mechanism B-1. The input shaft 7 passes through the center of the automatic transmission 10, defining its central axis, and an oil line (not shown) is formed along its outer periphery for supplying and discharging oil to/from an oil pump 18 which is driven by the input shaft 7. Further, on the interior side face 6bb of the bulkhead 6b, as viewed from the X2 side, is provided a washer 27 between the clutch drum (360° rotary element) of the transmission mechanism 5 and the bulkhead 6b. Radially outward of this washer 27, a leg portion 15b of the return plate 15 is fixed to the bulkhead 6b by bolts 25. The cylinder unit 10 of the hydraulic servo 2 is formed in the bulkhead member 6b radially outward of the position where the leg portion 15b is fixed.

Figure 7:
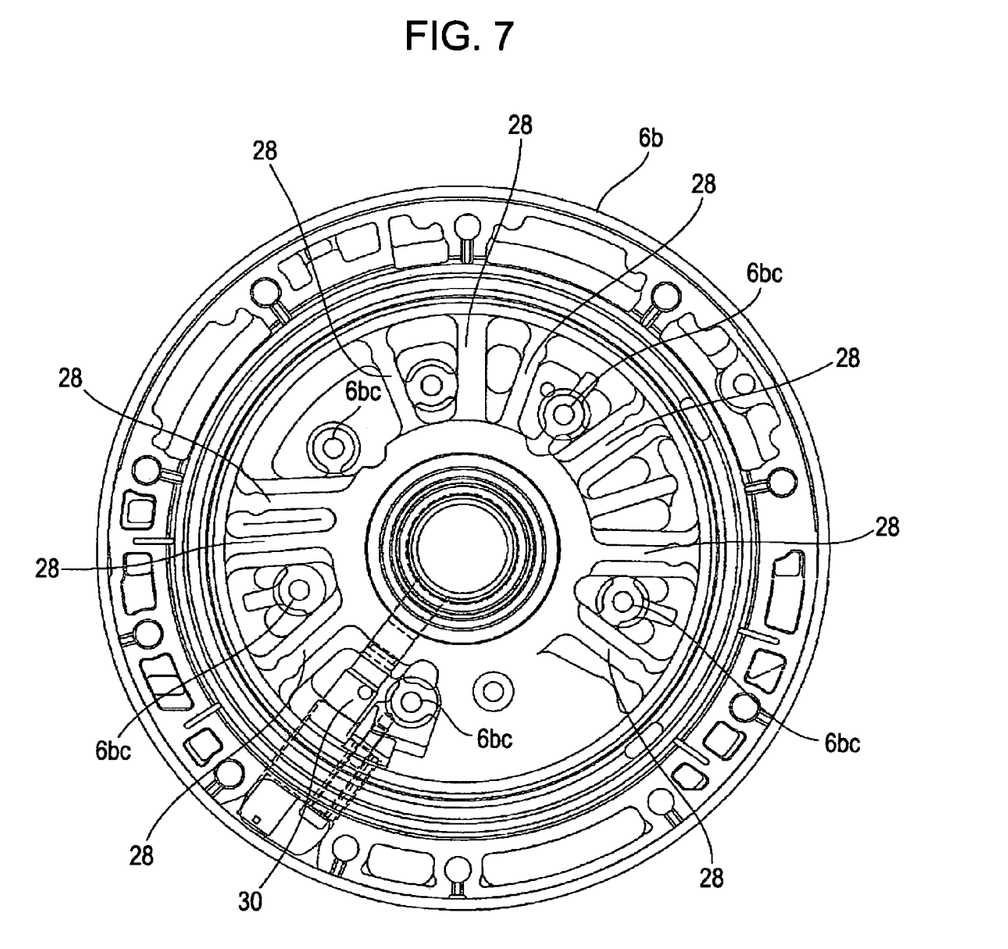
FIG. 7 is an axial view of the bulkhead shown in FIG. 2 from the perspective of the X-1 direction.

As shown in detail in FIG. 7, bolt holes 6bc, which receive the bolts 25 (see FIG. 1), extend through the bulkhead 6b at five locations unevenly distributed in a circular pattern. Leg portions 15b of the return plate 15 are fixed to the bulkhead member 6b by the bolts 25 and positioned so as to avoid ribs 28 (each having an oil line) and the input shaft sensor 30 (see FIG. 7). Also, as shown in FIG. 1, a gear-type oil pump 18 having an off-center driven gear is disposed on the front side of the bulkhead member 6b, and the pump body 19 is fixed by the bolts 25. This positioning is similar to the conventional case wherein protrusions are located at positions avoiding the ribs 28 and the input shaft sensor 30.

As shown in detail in FIGS. 1 and 2, the return springs 14 are coil-shaped springs defining an outer circumferential surface 14a, are compressed between the piston member 12 and the return plate 15, are arranged in a circular pattern ($\omega 1$-$\omega 2$ direction), and press the piston member 12 toward the bulkhead member 6b by the reactive force of the return plate 15. These return springs 14 are stronger, i.e., more rigid, than the conventional return springs. The return plate 15 is affixed to axial ends of the return springs 14, and affixed to the bulkhead member 6b. Also, the inner cylindrical surface 35 of the piston member 12 (described later) is configured for holding the return springs 14 seated therein.

Figure 5:
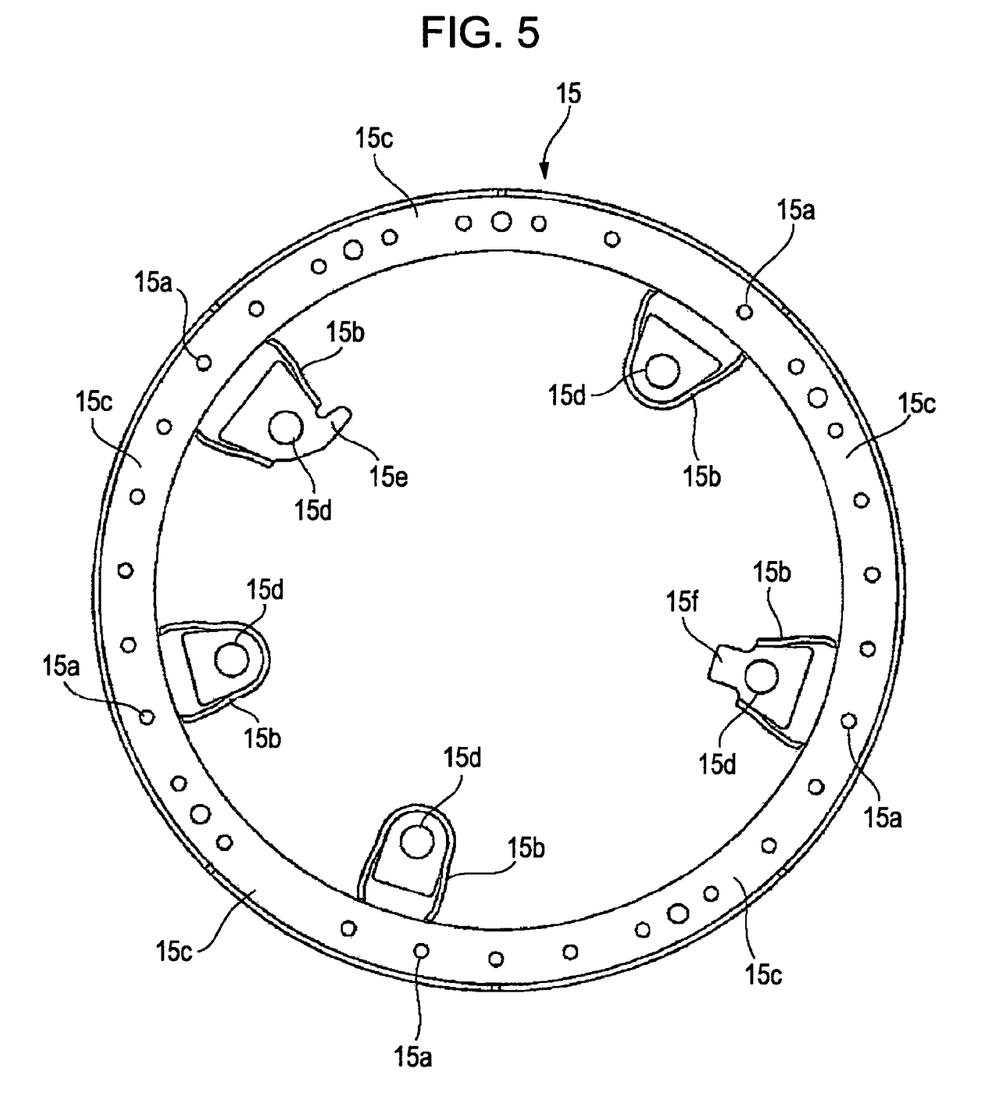
FIG. 5 is an axial view of a return plate of the hydraulic servo of FIG. 2, viewed from the perspective of the X-1 direction.

As shown in detail in FIG. 5, the return plate 15 has a radially extending annular base portion 15c, fixing protrusions 15a extending axially from the base portion, leg portions 15b, connecting holes 15d, and claws 15e and 15f. The base portion 15c is positioned at the X2 side of the piston member 12, and is formed in the shape of an annular disc. Multiple fixing protrusions 15a are provided around the circumference of the base portion 15c, to which axial ends of the return springs 14 are affixed. Five leg portions 15b extend radially inward from the inner periphery of the base portion 15c. The connecting holes 15d are formed in the distal ends of the leg portions 15b, through which the bolts 25 pass so as to fix the return plate to the bulkhead member 6b. The claws 15e and 15f are protrusions extending from distal ends of the leg portions 15b at positions corresponding to the lugs 27b and 27c protruding from the washer 27.

As shown in FIG. 1, the friction plates 23 are disposed axially along an inner cylindrical surface of the transmission case 6a, and include multiple outer friction plates 23a, splined to the inner cylindrical surface of the transmission case 6a, and interleaved with the outer friction plates 23a, inner friction plates 23b splined to the outer cylindrical surface of the clutch drum 38 of the transmission mechanism 5.

The clutch drum 38 is on the radially inner side of the brake mechanism B-1 and is rotatably supported by the bulkhead member 6b. The clutch C-3, clutch C-4, reduction planetary gear set DP and so forth of the transmission mechanism 5 are all mounted within the interior of clutch drum 38.

Figure 6:
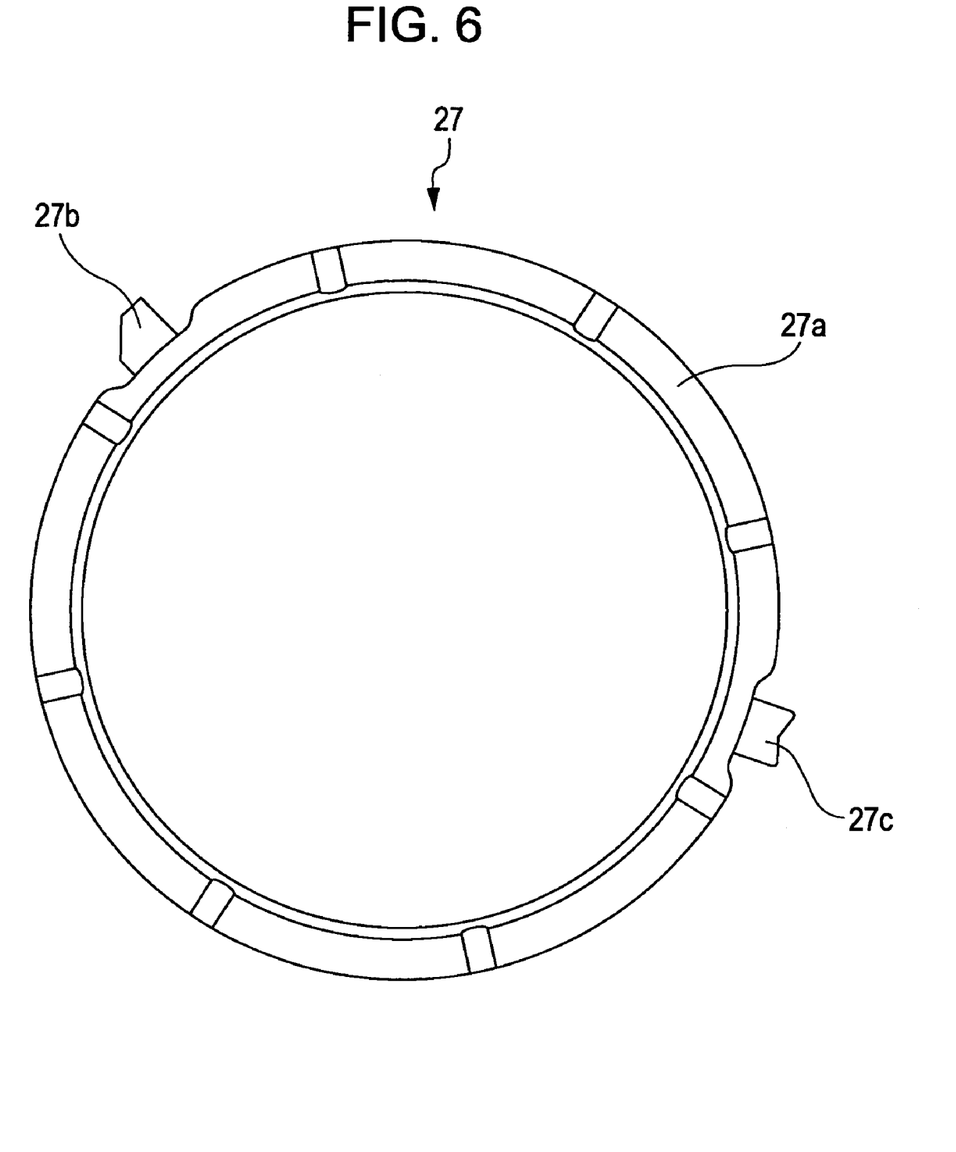
FIG. 6 is an axial view of the washer 27 shown in FIG. 2 from the perspective of the X-1 direction.

As shown in FIG. 1, the washer 27 is disposed radially inward of the bolted connection between the bulkhead member 6b and return plate 15 on the side face 6bb of the bulkhead member 6b, as described above, and prevents direct contact between the clutch drum 38 and the bulkhead member 6b. Further, as shown in FIG. 6, the washer 27 has lugs 27b and 27c which protrude radially outward from the base portion 27a.

As shown in FIG. 1, the piston 12 is fitted within the cylinder unit 10 for sliding movement in the X1-X2 direction, i.e., toward and away from the bulkhead member 6b in which the cylinder unit 10 is formed. Sealing rings 31 and 32 are disposed between the cylinder unit 10 and the piston 12, and an operating oil chamber 21 is sealed by these sealing rings 31 and 32. Also, the piston 12 has a cylindrical skirt 12a axially aligned to engage and press against the friction plates 23, responsive to oil pressure in the operating oil chamber 21. Further, the lower portion of the skirt 12a of the piston member 12 has a drain hole 12b for discharge of the lubricating oil supplied to the area of the piston skirt 12a and friction plates 23 during operation of the brake mechanism B-1. The lubricating oil discharged from the drain hole 12a flows into an oil pan (not shown) which is disposed on the lower side of the casing 6, by passing through a hole provided in the lower side of the casing 6.

Figure 4:
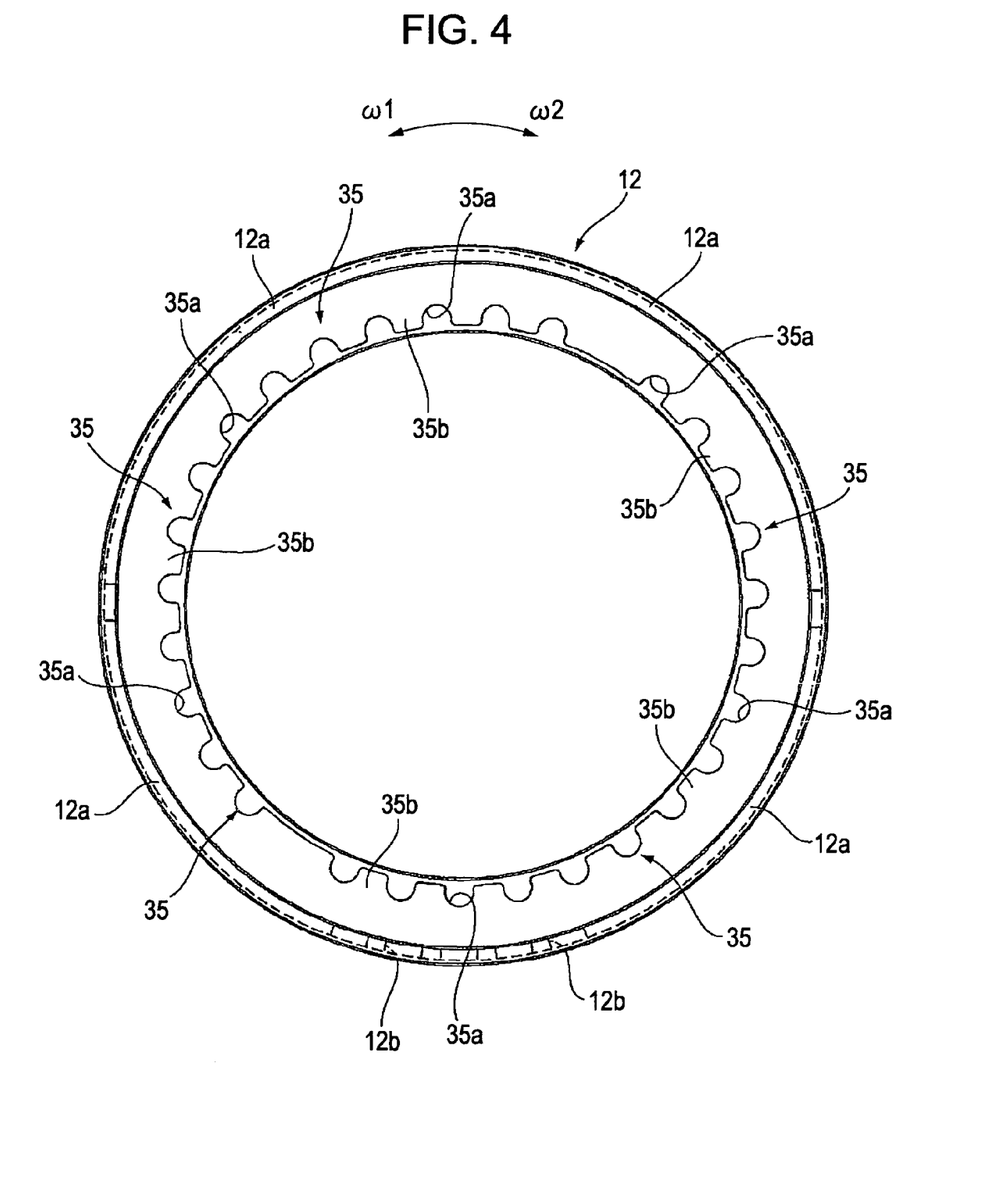
FIG. 4 is an axial cross-sectional view, from the X-1 direction, of the piston member of the hydraulic servo of FIG. 2.

As shown in detail in FIG. 4, the inner circumferential surface 35 of the piston member 12 has a plurality of multiple round grooves 35a alternating with supporting portions 35b (in the ω1-ω2 direction). The round grooves 35a are each formed in a generally cylindrical shape with an opening facing radially inward, and match the shape of the coil return springs 14, that is to say, a curved shape matching the shape of the external circumferential surface 14a of the return springs 14 and fitting around that external circumferential surface 14a. The supporting portions 35b extend axially along a major portion of the length of the return springs 14, and are configured to receive and resist the turning force (torque) on the piston 12.

The return plate 15, as shown in FIG. 5, has fixing protrusions 15a disposed at 29 locations on its base portion 15c and, while having at least two generally diametrically opposed locations, are not all evenly circumferentially spaced and are not symmetrical. On the other hand, the round grooves 35a in the radially inner portion 35 of the piston member 12 are located at positions corresponding to the positions of the above-described fixing protrusions 15a, and are fitted over/around the return springs 14 so that the piston member 12 is fixed against rotation by the return springs 14.

In operation of the hydraulic servo 2 oil is supplied through an oil line (not shown) to the operating oil chamber 21 by a hydraulic control device (not shown) and oil pressure thereby generated drives the piston member 12 in the X2 direction against the biasing force of the return springs 14. The skirt 12a of the piston member 12 is thereby caused to press the multiple friction plates 23 in the X2 direction, and the brake B-1 becomes engaged. Also, when the operating oil pressure is discharged through the oil line (not shown) from the operating oil chamber 21, the piston member 12 is driven for return in the X1 direction by the biasing force of the return springs 14, and the brake B-1 is thereby released.

When the brake B-1 is engaged, the skirt 12a of the piston member 12 is engaged with the outer friction plate 23a, so that rotational force is applied to the piston member 12. More specifically, as rotation of the clutch drum 38 is resisted and braked, the skirt 12a is dragged by the outermost friction plate 23a, for rotation corresponding the amount of play (gaps) between the splines of the outer friction plates 23a and splines on the transmission case 6a. Here, as described above, with the piston member 12 round grooves 35a grasping the return springs 14, i.e. partially surrounding outer circumferential surfaces 14a of the return springs 14, the turning force (torque) on the piston 12, received in braking the clutch drum 38, is applied to the lengths of the return springs 14. In other words, a circumferential force is applied to the sides of the 29 return springs 14. However, the strong rigidity against collapse of the return springs 14 is adequate to withstand the rotational force on the piston member 12. Further, because the return springs 14 are fixed to the bulkhead member 6b via the return plate 15, they are held against rotation relative to the bulkhead member 6b, i.e. relative to the casing 6.

Next, assembly of the hydraulic servo 2 will be described with reference to FIGS. 1 through 3. In assembling the hydraulic servo 2, first, the side face 6bb of the bulkhead member 6b is arranged facing upward, and the piston 12 is oriented with its skirt portion 12s opening upward and inserted into the cylinder unit 10 of the bulkhead member 6b. Further, a washer 27 is inserted in the bulkhead member 6b. All of the return springs 14 are attached to the return plate 15 and then the assembly of the return plate 15 and return springs 14 is inserted into the bulkhead member 6b while oriented with the return springs 14 axially aligned with grooves 35a in the piston 12. Thereafter, the return plate 15 is fixed to the bulkhead 6b with bolts 25 inserted through the connection holes 15d.

In attaching the piston 12 and the return plate 15 with return springs 14, if the round groves 35a of the inner portion 35 of piston 12 are not properly aligned with the return springs 14 (out of phase), the return springs 14 ride up on the supporting portions 35b on the inner circumference of the piston 12 and the piston 12 and return plate 15 cannot be fitted together. Further, because the connecting holes 15d in the return plate 15 and the bolt holes 6bc in the bulkhead 6b are unevenly distributed in circular patterns the assembly can be made only at a predetermined, proper alignment. With grooves 35a properly aligned with the return springs 14 (matching phase alignment) and the bolt holes in the return plate 15 and the bulkhead member 6b matched, the piston member 12 will have its drain hole 12b properly set at a lower position within the casing.

Note that the bolts 25, which fix the bulkhead member 6b and the return plate 15 together, also serve to position and attach the pump body 19 at five unevenly spaced positions around the bolt circle.

Further, as shown in FIG. 3, the claw portion 15e of the return plate 15 overlaps a portion of the protruding lug 27b of the washer 27 as viewed from the direction of X1. Also, the claw portion 15f similarly overlaps the protruding lug 27c. Thus, the lugs 27b and 27c are each locked in place between the bulkhead member 6b and the claw portions 15e and 15f, and so error in assembling the washer 27 i.e. at a position shifted from the predetermined position, can be avoided.

Thus, in the hydraulic servo 2 of the present invention, the return plate 15 has fixing protrusions 15a which determine the position of and fix the axial ends of the multiple return springs 14, and the piston member 12 has grooves 35a for grasping the multiple return springs 14 which are axially compressible (X1-X2 direction) and, as a consequence, even though the piston member 12 does not have a protrusion engaging the casing, the piston member 12 can be prevented from rotating relative to the return plate 15. Thus, casting (molding) of the piston member 12 can be simplified, the number of parts can be reduced, and the manufacturing process can be simplified.

While in the foregoing description, the hydraulic servo operates a multi-plate brake in a multi-gear speed automatic transmission, the hydraulic servo of the present invention may be used in a variable speed transmission or in a hybrid drive train, or in any other type of power drive train having a multi-plate brake.

Also, while the foregoing embodiment has the round grooves 35a, alternatively, holes may be provided to completely surround the outer peripheries 14a of the return springs 14, for example, or multi-sided shaped grooves such as square grooves or any such shape can be used, provided the function of the round grooves 35a, as described above, is obtained.

Also, while the lugs 27b and 27c of the washer 27 are described as being located at two positions, they can be provided at any number of positions consistent with their functions as described above.

Also, while the leg portions 15b of the return plate 15 are described as being fixed to the bulkhead member 6b by bolts 25, alternatively, they can be fixed by welding to the bulkhead 6b, for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission comprising:
    a casing;
    a transmission mechanism housed within said casing;
    a brake for braking a rotary element within the transmission mechanism, said brake having multiple friction plates and a hydraulic servo to engage said brake by axially moving a piston member against said multiple friction plates responsive to an oil pressure supplied to an operating oil chamber of said hydraulic servo; and
    wherein the hydraulic servo comprises:
        a cylinder formed in an interior surface of said casing:
            said piston member slidably mounted within said cylinder and forming said operating oil chamber in cooperation with said cylinder;
            a return plate fixed to said casing; and
            a plurality of return springs disposed compressed between said piston member and said return plate, for biasing said piston member in a direction for disengaging said brake:
    wherein said return plate comprises:
        a plurality of fixing protrusions, for positioning and fixing axial ends of said return springs on said return plate and disposed unevenly spaced in a circle adjacent an outer circumference of the return plate; and
        a plurality of connecting portions through which said return plate is fixed to said casing, said connection portions being disposed unevenly spaced in a circle adjacent an outer circumference of the return plate;
    wherein said piston member comprises:
        an inner circumferential surface configured with a plurality of round grooves which partially surround outer surfaces of said return springs thereby grasping said return springs and preventing said piston member from rotating, said plurality of round grooves being located at positions corresponding to positions of said return springs and unevenly spaced;
        a cylindrically shaped skirt axially aligned to press against said multiple friction plates of said brake; and
        a drain hole for discharge of oil from a lower portion of an interior of said skirt.

2. The automatic transmission according to claim 1, wherein said casing comprises:
    a transmission case housing said transmission mechanism and a bulkhead member isolating the transmission mechanism within the transmission case;
    a washer member disposed on an interior side face of said bulkhead member, said washer member having radial protrusions extending radially along the side face of said bulkhead member; and wherein
    said return plate further comprises leg portions fixed to an interior side face of said bulkhead member, and claw portions extending from the leg portions, the radial protrusions of said washer member being sandwiched between said face of said bulkhead member and said claw portions, thereby fixing said washer member to the side face of said bulkhead member.

* * * * *